March 18, 1958  O. R. WILLIAMS, JR  2,827,015
AUTOMATIC WATERING TROUGH
Filed Aug. 23, 1956
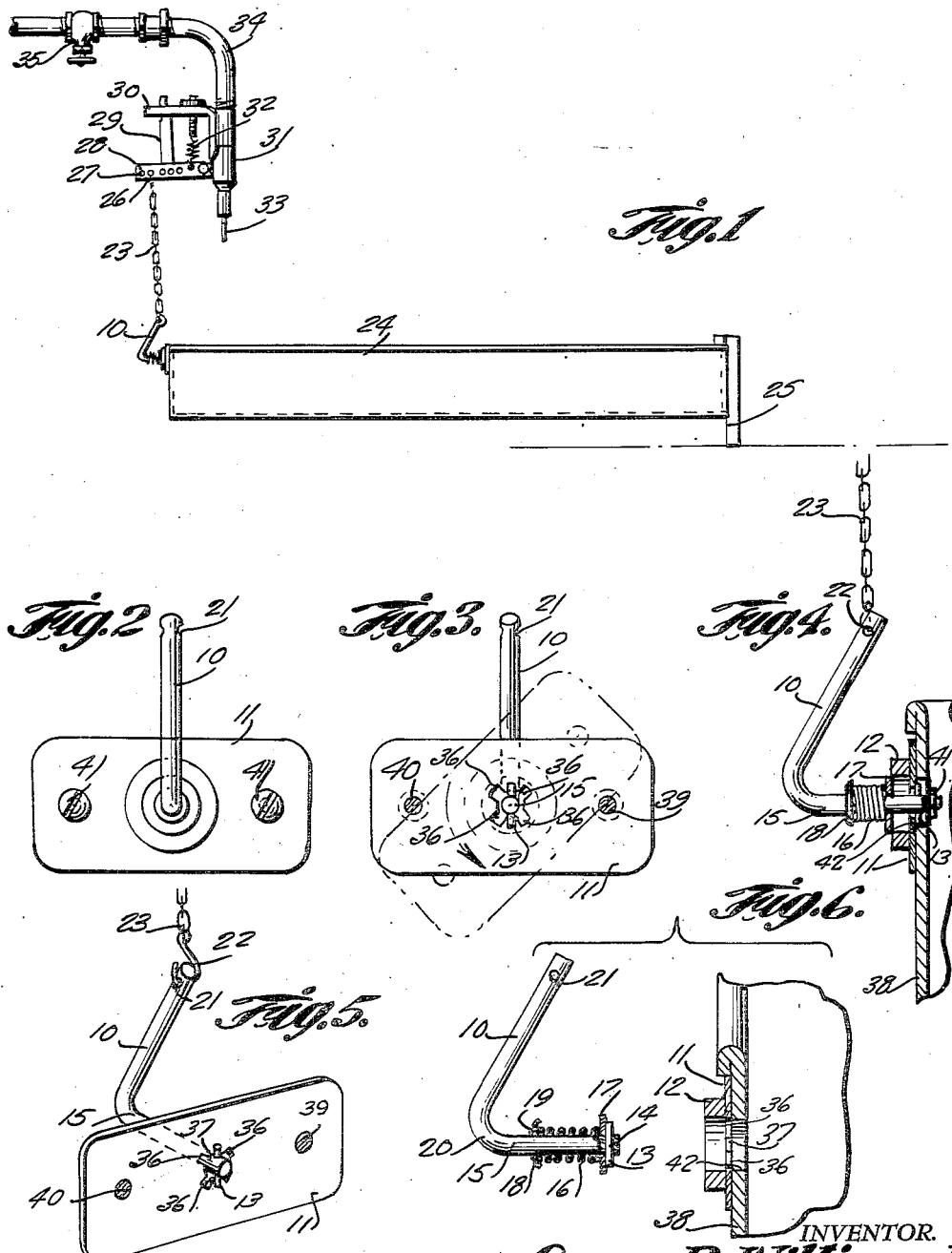
INVENTOR.
Oscar R. Williams, Jr.
BY Victor J. Evans & Co.
ATTORNEYS

United States Patent Office 2,827,015
Patented Mar. 18, 1958

2,827,015

AUTOMATIC WATERING TROUGH

Oscar R. Williams, Jr., Millerville, Ala., assignor of one-half to Oscar R. Williams, Sr.

Application August 23, 1956, Serial No. 605,849

3 Claims. (Cl. 119—81)

This invention relates to watering troughs particularly adapted for poultry and wherein one end of a trough is supported by legs and the other suspended from a valve assembly with a chain or the like, and in particular a connection between the lower end of a chain hanging from a valve assembly and a trough wherein upon accidental displacement of the watering trough, such as being turned over by poultry, or the like the connection snaps from the end of the trough releasing the chain whereby the valve snaps to a closed position.

The purpose of this invention is to provide means for instantly closing a water supply valve of a poultry watering trough upon accidental displacement of the poultry trough to prevent waste of water and also to prevent water being deposited upon the ground around a drinking trough.

Watering troughs, particularly adapted for young poultry are supported at one end and suspended from overhead structure at the other in order to facilitate removing the troughs for cleaning and also replacing the troughs and with young chicks the troughs remain in position indefinitely. However, as the chicks grow the troughs are often turned over or moved to one side and with the end of the trough connected to a supply valve with a chain the valve remains open even though the trough is turned over or moved to such a position that it will not receive water from the valve. In such instances the valve continues to operate dropping water upon the ground and it is not unusual to find young chicks walking around in a pool of water. This is an unhealthy condition and causes loss of life to many chicks. With this thought in mind this invention contemplates a snap on connection between the lower end of a supporting chain and the water trough whereby upon twisting or turning of the trough the connecting elements are disengaged and the supporting means released. Upon the release of the supporting means the valve is closed by a spring so that substantially all waste of water is obviated.

The object of this invention is, therefore, to provide a disengageable connection between the lower end of a supporting chain and a watering trough whereby the connection is instantly separated upon movement of the trough.

Another object of the invention is to provide a separable connection between one end of a watering trough and a supporting element wherein the connection may readily be replaced after being accidentally separated.

Another important object of the invention is to provide a separable connection for suspending an end of a watering trough from a valve element in which the device may be used on valves and watering troughs now in use without changing the structure of the valve or trough.

A further object of the invention is to provide a separable connection between the watering trough and a valve from which an end of the trough is suspended in which the connection is of a simple and economical construction.

With these and other objects and advantages in view the invention embodies a plate having openings therethrough with radially disposed notches extending from one of the openings, a substantially L-shaped bar positioned with a horizontally disposed section thereof extended through the opening of the plate in the edges of which the notches are positioned, a pin extended through the end of the horizontal section of the bar and adapted to be positioned, selectively, with ends of the pin in registering relation with slots through the plate or in such positions that the ends of the pin do not register with such slots, a spring positioned around said horizontally disposed end of the bar and adapted to draw the horizontally disposed section of the bar from the connection, and means for connecting a chain to the upper end of a substantially vertically disposed section of the L-shaped bar.

Other features and advantages of the invention will appear from the following description taken in connection with the drawing, wherein:

Figure 1 is a side elevational view showing a watering trough with one end supported on a leg and with the other suspended from a valve with a chain and trigger combination.

Figure 2 is an end elevational view showing the bar or trigger extended from an opening in a mounting plate.

Figure 3 is a view similar to that shown in Fig. 2 looking from the opposite side and showing the mounting plate turned to an angle, such as 45 degrees, wherein ends of a pin of the trigger are snapped through notches in the plate separating the connection, the plate being shown in the separable position in broken lines.

Figure 4 is a vertical section through the end of a drinking trough showing the trigger secured therein.

Figure 5 is a perspective view, similar to that shown in Fig. 3 also showing the trigger retained in the plate by the end of a pin extended through the lower end thereof.

Figure 6 is an exploded view showing the trigger removed from the plate and end of the trough and also showing the trough with parts broken away.

Referring now to the drawing wherein like reference characters denote corresponding parts the improved watering trough latching device of this invention includes a trigger 10 formed with a substantially L-shaped bar, a mounting plate 11 having a hub 12 on the outer surface, a pin 13 positioned in an opening 14 in the end of the lower section 15 of the trigger, and a spring 16 positioned between a washer 17 on the section 15 and a collar 18 secured to the section 15, such as by welding, as shown at the point 19.

The section 15 of the L-shaped bar or trigger is secured to the upper portion of the bar with an arcuate section 20 and the upper end of the vertically disposed section is provided with an opening 21 through which a hook 22 on the lower end of a chain 23 extends whereby the trigger and mounting plate are suspended from a supply valve.

As illustrated in Fig. 1 the watering trough 24 is supported, at one end with a stand or leg 25 and the opposite end is suspended from a valve assembly, by a chain, such as the chain 23 in which the upper end of the chain is secured by a link or clevis 26 in one of the openings 27 of a bar 28 and the bar is retained in the position of supporting the trough by a latch 29 that extends through an opening in a bar 30 extended from the upper end of the valve body 31. With the parts supported as illustrated and described the weight of water in the trough 24 pulls the lever 28 downwardly with the latch 29 limiting downward movement thereof and as water is used from the trough a spring 32 draws the lever 28 upwardly opening the valve 33 wherein water drops downwardly over a guide 33 so that the water drops directly into the trough. Water is supplied to the valve 31 through a connection 34 and the connection 34 is provided with a manually actuated valve 35.

With the lower end of the chain secured to the end of the trough in the conventional manner the weight of the trough holds the lever 28 downwardly with the valve closed and should the trough be accidently turned over there is still sufficient tension in the chain 23 to hold the lever 28 so that water will drop from the valve and, consequently, a brooder house is often flooded when a trough is accidently displaced.

With the trigger formed as illustrated and described the pin 13 is retained in the opening 14 of the section 15 of the trigger with ends of the pin adapted to register with notches 36 extended radially from an opening 37 in the plate 11 and with turning movement of the trough the ends of the pin move into registering relation with the slots 36 whereby the end of the pin is snapped through the opening 37 by the spring 16 and the trigger is separated from the mounting plate 11 and end 38 of the trough. With the parts separated the spring 32 draws the lever 28 upwardly and closes the valve 31.

The mounting plate 11 is also provided with openings 39 and 40 by which the plate is secured to the end wall 38 of the trough with bolts 41. In this position the end of the section 15 carrying the pin 13 will extend into the opening 42 of the end of the trough 38, Fig. 4, to permit free movement of the section 15 and pin 13 as previously described.

With the slots 36 positioned as shown in Fig. 3 and with the plate 11 extended horizontally across the end of the trough ends of the pin 13 are positioned between the notches or slots and the device is in position for supporting the trough, however, with the trough accidently displaced and slightly turned the ends of the pin are moved to positions in registering relation with the slots 36, in which positions the spring 16 snaps the section 15 of the trigger through the opening 37 of the plate 11, as illustrated in Fig. 6 whereby the chain is free and the spring 32 is adapted to pull the lever 28 upwardly thereby closing the valve so that water does not drop upon a floor of the house or upon the ground.

The trigger is readily replaced by an attendant by inserting the end of the section 15 through the opening 37 with the trigger turned to an angle of 45 degrees whereby the ends of the pin 13 pass through the slots 36 with the washer 17 bearing against the outer end of the hub 12, as shown in Fig. 4. With the pin inserted through the slot the trigger is turned to an angle of 45 degrees whereby the upper end is vertically disposed and with the upper end connected to the chain 23 the device is adapted to support one end of the trough 24.

The valve 31 is a double acting valve whereby weight of water in the trough holds the lever 28 downwardly, closing the valve and as water is used from the trough the reduced weight permits the lever 28 to move upwardly sufficiently to open the valve, however, when the member 10 is disconnected from the end of the trough the spring 32 snaps the lever 28 upwardly again closing the valve.

It will be understood that modifications, within the scope of the appended claims, may be made in the design and arrangement of the parts without departing from the spirit of the invention.

What is claimed is:

1. In a watering trough, the combination which comprises a horizontally disposed open body, a leg supporting one end of the body, a mounting plate of rectangular formation having a centrally disposed opening therethrough and having radially disposed notches extended from the opening positioned on the end of the body opposite to that on which the leg is positioned, a substantially L-shaped bar having a vertically disposed section and a horizontally positioned section and having a pin with extended ends extended through the horizontally positioned section whereby with the horizontally positioned section extended through the opening of the mounting plate the pin may be positioned with ends thereof in registering relation with the notches extended from the opening of the mounting plate or positioned midway between the notches, a hub mounted on the plate with an opening therein contiguous with the opening in the plate, a washer positioned on said horizontally positioned section adjacent the end having the pin therein, a collar secured to said horizontally positioned section in spaced relation to said washer, a spring positioned around the horizontally disposed section intermediate of the collar and washer thereon for urging said horizontally disposed section outwardly through the opening of the mounting plate, a supply valve positioned above the trough, and means connecting the valve to the vertically disposed section of the L-shaped bar.

2. In a release device, the combination which comprises a watering trough having a supporting leg at one end, a mounting plate of rectangular formation having a centrally disposed opening with radially disposed notches extended therefrom extended therethrough positioned on the end of the trough opposite to the end supported by the leg, a trigger having a pin extended through one end thereof extended through the opening of the mounting plate, a hub mounted on the plate with an opening therein contiguous with the opening in the plate, a washer positioned on said trigger adjacent the end having the pin therein, a collar secured to said trigger in spaced relation to said washer, a spring extended around the trigger intermediate of the collar and washer thereon and positioned to urge the pin against the inner surface of the mounting plate, a valve positioned above the trough, a valve actuating lever extended from the valve, and a chain connecting the valve actuating lever to the trigger.

3. In a release device, the combination which comprises a watering trough having a supporting leg at one end, a mounting plate of rectangular formation having a centrally disposed opening with radially disposed notches extended therefrom extended therethrough positioned on the end of the trough opposite to the end supported by the leg, a trigger having a pin extended through one end thereof extended through the opening of the mounting plate, a hub mounted on the plate with an opening therein contiguous with the opening in the plate, a washer positioned on said trigger adjacent the end having the pin therein, a collar secured to said trigger in spaced relation to said washer, a spring extended around the trigger intermediate of the collar and washer thereon, and positioned to urge the pin against the inner surface of the mounting plate, a valve positioned above the trough, a valve actuating lever extended from the valve, and a chain connecting the valve actuating lever to the trigger, the pin extended through the trigger being positioned whereby with the trigger vertically disposed the ends of the pin are urged against the inner surface of the mounting plate whereby the trough is supported from the valve lever and whereby with the trough turned the ends of the pin are in registering relation with the notches extended from the opening of the mounting plate whereby the trigger is separated from the mounting plate.

References Cited in the file of this patent

UNITED STATES PATENTS

| | | |
|---|---|---|
| 1,420,589 | Talbot | June 20, 1922 |
| 2,512,839 | Pruitt | June 27, 1950 |
| 2,541,622 | Toadvine | Feb. 13, 1951 |
| 2,703,098 | Smallegan | Mar. 1, 1955 |
| 2,716,423 | Landgraf | Aug. 30, 1955 |